United States Patent
Valint, Jr. et al.

[11] Patent Number: 5,981,675
[45] Date of Patent: Nov. 9, 1999

[54] SILICONE-CONTAINING MACROMONOMERS AND LOW WATER MATERIALS

[75] Inventors: Paul L. Valint, Jr., Pittsford; Joseph A. McGee, Dewitt; Richard M. Ozark, Solvay, all of N.Y.

[73] Assignee: Bausch & Lomb Incorporated, Rochester, N.Y.

[21] Appl. No.: 09/206,470

[22] Filed: Dec. 7, 1998

[51] Int. Cl.$^6$ ........................................ C08F 30/08
[52] U.S. Cl. ........................................ 526/279; 525/302
[58] Field of Search ............................... 526/279; 525/302

[56] References Cited

U.S. PATENT DOCUMENTS

| | | | |
|---|---|---|---|
| 4,120,570 | 10/1978 | Gaylord | 351/40 |
| 4,153,641 | 5/1979 | Deichert et al. | 260/827 |
| 4,734,475 | 3/1988 | Goldenberg et al. | 526/273 |
| 5,010,141 | 4/1991 | Mueller | 525/276 |
| 5,034,461 | 7/1991 | Lai et al. | 525/100 |
| 5,070,169 | 12/1991 | Robertson et al. | 528/25 |
| 5,079,319 | 1/1992 | Mueller | 526/238.23 |
| 5,128,434 | 7/1992 | Lai | 528/65 |
| 5,194,556 | 3/1993 | Mueller et al. | 528/28 |
| 5,244,981 | 9/1993 | Seidner | 525/479 |
| 5,306,765 | 4/1994 | Kuriyama et al. | 524/547 |
| 5,314,960 | 5/1994 | Spinelli et al. | 525/280 |
| 5,336,797 | 8/1994 | McGee et al. | 556/419 |
| 5,371,147 | 12/1994 | Spinell et al. | 525/288 |
| 5,387,663 | 2/1995 | McGee et al. | 526/279 |
| 5,563,184 | 10/1996 | McGee et al. | 523/107 |
| 5,710,302 | 1/1998 | Kunzler et al. | 556/434 |

FOREIGN PATENT DOCUMENTS

0425436 B1 12/1996 European Pat. Off. .......... C08F 8/30

*Primary Examiner*—David W. Wu
*Assistant Examiner*—Caixia Lu-Rutt
*Attorney, Agent, or Firm*—Mary Anne Magee

[57] ABSTRACT

Low water siloxane macromonomer are disclosed. This macromonomer can be copolymerized with unsaturated silicone containing monomers to prepare polymeric materials useful as biomedical devices. These macromonomers are particularly suited for soft contact lens applications.

26 Claims, No Drawings

SILICONE-CONTAINING MACROMONOMERS AND LOW WATER MATERIALS

BACKGROUND OF THE INVENTION

The present invention generally relates to polymeric silicone compositions useful as a contact lens material.

Polymeric silicone materials have been used in a variety of biomedical applications, including, for example, in contact lenses and intraocular lenses. Such materials can generally be subdivided into hydrogels and non-hydrogels (the latter referred to herein as "low water" materials). Silicone hydrogels constitute crosslinked polymeric systems that can absorb and retain water in an equilibrium state and generally have a water content greater than about 5 weight percent and more commonly between about 10 to about 80 weight percent. Such materials are usually prepared by polymerizing a mixture containing at least one silicone-containing monomer and at least one hydrophilic monomer. Either the silicone-containing monomer or the hydrophilic monomer may function as a crosslinking agent (a crosslinker being defined as a monomer having multiple polymerizable functionalities) or a separate crosslinker may be employed.

Low water silicone materials may include rigid materials, useful for rigid gas permeable contact lenses, or flexible materials useful for soft contact lenses. Like their hydrogel counterparts, such low water silicone materials may be based on the same class of silicone-containing monomeric units; however, unlike silicone hydrogels, "low water" silicone materials do not include appreciable amounts of hydrophilic monomers and/or internal wetting agents (i.e. typically less than 5 to 10 weight percent). As such, low water silicone materials, as their name suggest, do not absorb or retain appreciable amounts of water, e.g. less than about 5 weight percent, and more typically less than about 1 or 2 weight percent.

It is important that low water silicone compositions, especially for soft contact lens applications, have desirable oxygen permeability, modulus (Young's modulus of elasticity) and elastic recovery. This is particularly important in the formation of soft contact lenses, as the modulus and elastic recovery of the lens material can have a significant impact upon lens "comfort." Lenses possessing high modulus often have a perceived stiffness; lenses with too high elastic recovery can exhibit a "suction cup" effect on the eye.

One class of silicone monomers commonly used in silicone-containing contact lens materials are bulky polysiloxanylalkyl methacrylates, e.g. methacryloxypropyl tris (trimethylsiloxy) silane (commonly referred to as "TRIS"). Since these "bulky" monomers contain a large amount of silicon per molecule, they are useful for increasing oxygen permeability of materials, a desirable property for contact lens and other biomedical device applications. However, although TRIS is known to reduce the modulus of some silicone hydrogels, i.e. polyurethane-polysiloxane hydrogel compositions, (see for example; Lai, Yu Chin, *The Role of Bulky Polysiloxanylalkyl Methacrylates in Polyurethane-polysiloxane Hydrogels*, Proceedings of the American Chemical Society Division of Polymeric Materials: Science and Engineering, Vol. 72, pg. 118–119, (1995)), the use of TRIS monomeric units within "low water" silicone compositions generally increases the modulus of the resulting material. As such, TRIS monomeric units are not generally helpful in reducing the modulus of low water silicone materials.

In summary, low water silicone materials are sought for soft contact lens or intraocular lens applications which possess relatively low modulus, e.g. below 300 g/mm² and preferably from 20 g/mm² to about 150 g/mm², and with a suitable elastic recovery rate. Furthermore, for such applications, the materials must be optically clear, manufacturable (e.g., capable of being molded or machined), have acceptable oxygen permeability, biocompatibility and resist deposit formation. Low water materials are desired which can be easily synthesized, purified, and analyzed.

SUMMARY OF THE INVENTION

The present invention provides for novel siloxane macromers comprising the polymerization product of a mixture comprising:

(A) a macromonomer represented by the following structural formula (I):

$(X)(E)_n$        (I)

wherein X is derived from a copolymer prepared by reacting the following components: at least 50 mole % of an ethylenically unsaturated silicon-containing monomer, 2.5 to 20 mole % of an ethylenically unsaturated monomer containing a hydroxyl, amino or carboxylic acid radical, 2.5 to 20 mole % of a chain transfer agent, and 0 to 15 mole % of an ethylenically unsaturated monomer other than monomers (a) or (b), the weight percent of components (a), (b), (c) and (d) being based on the total amount of said components; E is a polymerizable, ethylenically unsaturated radical; n is at least 2; and (B) an ethylenically unsaturated silicone-containing monomer other than the macromonomer of Formula (I).

Also provided by the present invention are copolymers prepared using the macromonomer of formula 1 and intermediate polymers used to prepare the macromonomer. The copolymers are useful in biomedical devices such as soft and hard contact lenses, intraocular lenses, heart valves and other prostheses.

DETAILED DESCRIPTION OF PREFERRED EMBODIMENTS

The present invention relates to low water polymeric silicone compositions which are the polymerization product of a mixture comprising:

(A) a macromonomer of the general formula (I):

$(X)(E)_n$        (I)

wherein:
X is derived from a copolymer prepared by reacting the following components:
  (a) at least 50 mole % of an ethylenically unsaturated silicon-containing monomer,
  (b) 2.5 to 20 mole % of an ethylenically unsaturated monomer containing a hydroxyl, amino or carboxylic acid radical,
  (c) 0 to 15 mole % of an ethylenically unsaturated monomer other than monomers (a) or (b),
  (d) 2.5 to 20 mole % of a chain transfer agent that provides the copolymer with hydroxyl or amino functional radical, and
the weight percent of components (a), (b), (c) and (d) being based on the total amount of said components;
E is a polymerizable, ethylenically unsaturated radical;
n is at least 2; and (B) an ethylenically unsaturated silicone-containing monomer other than the macromonomer of formula (I).

The monomer mixture may comprise from about 1 to about 99 weight percent of the macromonomer of Formula (I), but more preferably from about 5 to about 60 weight percent, and more preferably from about 5 to about 50 weight percent of this macromonomer. The other silicone monomers are included in the monomer mixture from about 1 to about 99 weight percent, preferably from about 40 to 95 weight percent, and more preferably from about 50 to about 95 weight percent.

The macromonomer of Formula (I) can be synthesized by techniques known in the art. Generally, the macromonomers are prepared by, first, copolymerizing by free radical polymerization a mixture of the ethylenically unsaturated silicon-containing monomer (a), the ethylenically unsaturated monomer containing an active hydrogen atom (b) and the ethylenically unsaturated monomer (c) (if present), in the presence of the chain transfer agent (d). Subsequently, this copolymer is reacted with a suitable ethylenically unsaturated radical to form a macromonomer of the copolymer having the ethylenically unsaturated radical E. Representative synthesis of a macromonomer of Formula (I) is provided in Examples 1–9.

The ethylenically unsaturated silicon-containing monomer (a) used as a comonomer for copolymer (X) may include silicone-containing monomers known in the contact lens art. However, this silicon-containing monomer is preferably monofunctional, i.e., including only one ethylenically unsaturated radical. Most preferred are known bulky polysiloxanylalkyl (meth)acrylic monomers represented by Formula (II):

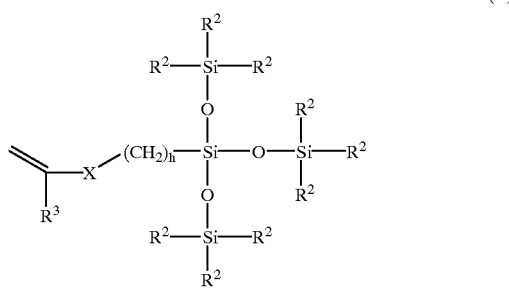

(II)

wherein:
X denotes —COO—, —CONR$^4$—, —OCOO—, or —OCONR$^4$— where each where R$^4$ is independently H or lower alkyl; R$^3$ denotes hydrogen or methyl; h is 1 to 10; and each R$^2$ independently denotes a lower alkyl radical, a phenyl radical or a radical of the formula

wherein each R$^5$ is independently a lower alkyl radical or a phenyl radical.

Such bulky monomers specifically include methacryloxypropyl tris(trimethylsiloxy)silane ("TRIS"), pentamethyldisiloxanyl methylmethacrylate, tris(trimethylsiloxy) methacryloxy propylsilane, phenyltetramethyl-disiloxanylethyl acrylate, methyldi(trimethylsiloxy)methacryloxymethyl silane, 3-[tris(trimethylsiloxy)silyl] propyl vinyl carbamate, 3-[tris(trimethylsiloxy)silyl] propyl allyl carbamate, and 3-[tris(trimethylsiloxy)silyl] propyl vinyl carbonate.

The ethylenically unsaturated monomer (b) containing an active hydrogen atom includes monomers having hydroxyl, amino or carboxylic acid radicals. Hydroxy-substituted monomers include hydroxy (meth)acrylates and (meth) acrylamides, such as 2-hydroxyethyl methacrylate, 2-hydroxyethyl acrylate, glycerol methacrylate, glycerol acrylate, polyethylene glycol methacrylate, polyethylene glycol acrylate and N-2-hydroxyethyl methacrylamide. Amino-substituted monomers include allyl amine. Monomers with carboxylic acid radicals include methacrylic acid and acrylic acid. Since monomer (b) contains active hydrogen atoms, it provides appropriate functionality for subsequent reaction with ethylenic unsaturated radical (E).

Copolymer X may optionally include other monomeric units, i.e., the monomer mixture used to prepare copolymer X may optionally include an ethylenically unsaturated monomer (c) that is distinct from than monomers (a) and (b). Generally, this monomer will be a hydrophobic monomer so that the resultant macromonomer is hydrophobic. Examples are hydrophobic (meth)acrylic esters, such as alkyl (meth) acrylates and fluoroalkyl (meth) acrylates wherein the alkyl moiety contains 1–12 carbon atoms.

The chain transfer agent (d) serves to control the molecular weight of copolymer (X) and provides appropriate functionality for subsequent reaction of ethylenic unsaturated radical (E). Suitable chain transfer agents include mercapto carboxylic acids, mercapto alcohols (also referred to as hydroxymercaptans), and aminomercaptans. Preferred chain transfer agents include thioglycolic acid, 2-mercaptoethanol and 2-aminoethanethiol. Generally, the molar ratio of chain transfer agent to monomers (a), (b) and (c) will be about 0.005 to about 0.5.

The chain transfer agent (d) is selected so that it has a reactive functional group which is the reactive with the reactive functional group of monomer (b), i.e., hydroxyl, amino or carboxylic acid. For example, when monomer (b) contains a hydroxyl radical (from a monomer such as 2-hydroxyethyl methacrylate), suitable chain transfer agents used must have a radical reactive with the hydroxyl radical, such as 2-mercaptoethanol.

The resultant copolymer (X) is then reacted with a compound containing an ethylenically unsaturated radical so that the copolymer is endcapped with ethylenically unsaturated radical (E). More specifically, these ethylenic compounds are reactive with functional groups of copolymer (X) provided by the chain transfer agent and monomer (b). For example, if copolymer (X) includes carboxylic acid radicals from the chain transfer agent (d) and monomer (b) (such as methylacrylic acid), glycidyl methacrylate can provide macromonomer A with methacrylate functionality. If copolymer (X) contains a hydroxy or amino functionality from the chain transfer agent (d) and monomer (b), isocyanato ethyl methacrylate or (meth)acryloyl chloride can provide macromonomer A with methacrylate functionality. Vinyl chloro formate can provide macromonomer A with vinyl functionality. Other combinations will be apparent to one skilled in the art.

Preferred macromonomer A of Formula (I) contain relatively high amounts of silicone per molecule. Accordingly, preferred macromonomers include macromonomers of Formula (Ia):

(X)(E)$_n$     (Ia)

wherein:
X is derived from a copolymer prepared by reacting the following components:
(a) at least 80 mole % of an ethylenically unsaturated silicon-containing monomer, more preferably at least 90 mole %, (b) 2.5 to 20 mole % of an ethylenically unsaturated monomer containing a hydroxyl, amino or carboxylic acid radical, (c) 0 to 15 mole % of an ethylenically unsaturated monomer other than monomers (a) or (b), (d) 2.5 to 20 mole % of a chain transfer agent, and the mole percent of components (a), (b), (c) and (d) being based on the total amount of said components;

E is a polymerizable, ethylenically unsaturated radical; and n is at least 2.

Preferred monomers (a), (b) and (c), and chain transfer agent (d) and radical (E), in Formula (Ia) are as discussed above for Formula (I).

For low water materials useful in soft contact lens applications, homopolymers of the Formula (I) macromonomers are not particularly effective because such materials will generally lack elasticity. Accordingly, the low water materials of the present invention for applications such as soft contact lenses are based on copolymers of the Formula (I) macromonomers and at least one silicone containing monomer (B). In other words, the low water silicone materials are prepared by polymerizing a mixture comprising a macromonomer of Formula (I) and an ethylenically unsaturated silicone-containing monomer other than the macromonomer of formula (I).

One preferred class of silicone-containing monomers include bulky polysiloxanylalkyl (meth)acrylates of Formula (II), including TRIS.

Another preferred class is difunctional, ethylenically "end-capped" siloxane-containing monomers represented by Formula (III):

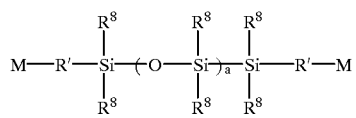
(III)

wherein:
each M is independently an activated unsaturated group;
each R' is independently an alkylene group having 1 to 10 carbon atoms wherein the carbon atoms may include ether, urethane or ureido linkages therebetween;

each $R^8$ is independently selected from monovalent hydrocarbon radicals or halogen substituted monovalent hydrocarbon radicals having 1 to 18 carbon atoms which may include ether linkages therebetween, and a is an integer equal to or greater than 1.

Representative $R^8$ radicals include alkyl groups, phenyl groups and fluoro-substituted alkyl groups. It is further noted that at least one $R^8$ may be a fluoro-substituted alkyl group such as that represented by the formula:

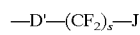

wherein:

D' is an alkylene group having 1 to 10 carbon atoms wherein said carbon atoms may include ether linkages therebetween;

J is hydrogen, fluorine, or alkyl group but preferably hydrogen; and s is an integer from 1 to 20, preferably 1 to 6.

With respect to M, the term "activated" is used to describe ethylenically unsaturated groups which include at least one substituent which facilitates free radical polymerization. Preferably the activating groups facilitate polymerization under mild conditions, such as ambient temperatures. Although a wide variety of such groups may be used, preferably, M is an ester or amide of (meth)acrylic acid represented by the general formula:

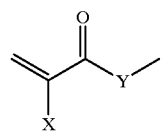

wherein X is preferably hydrogen or methyl, and Y is —O— or —NH—. Examples of other suitable activated unsaturated groups include vinyl carbonates, vinyl carbamates, acrylonitryl, and styryl.

Specific examples of preferred monomers of Formula (III) include those represented by Formulae (IIIa) and (IIIb):

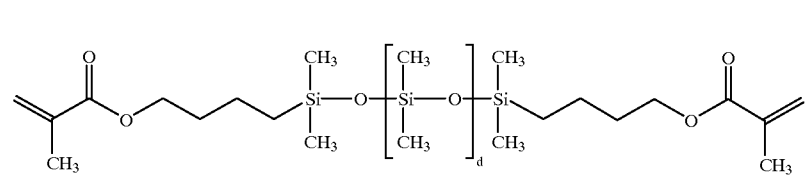
(IIIa)

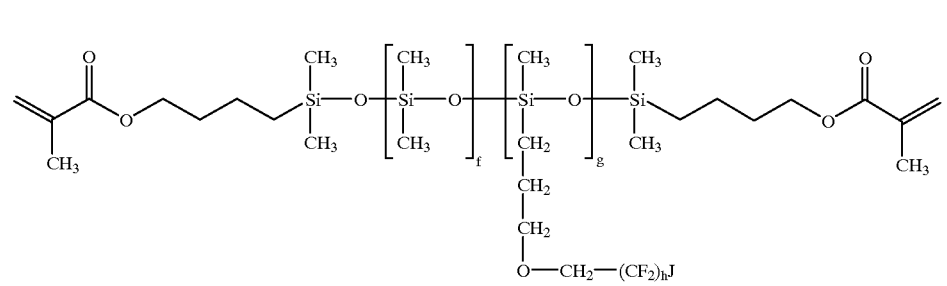
(IIIb)

wherein:
  d, f, and g are integers from 0 to 250, preferably from 2 to 100,
  h is an integer from 1 to about 20; and
  J is hydrogen or fluorine.

A further suitable class of silicone-containing monomers includes monomers of the Formulae (IV) and (V):

or

wherein:
  D denotes an alkyl diradical, an alkyl cycloalkyl diradical, a cycloalkyl diradical, an aryl diradical or an alkylaryl diradical having 6 to 30 carbon atoms;
  G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;
  * denotes a urethane or ureido linkage;
  a is at least 1;
  A denotes a divalent polymeric radical of the formula:

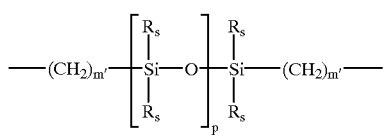

wherein:
  each $R_s$ independently denotes an alkyl or fluoro-substituted alkyl group having 1 to 10 carbon atoms which may contain ether linkages between carbon atoms;
  m' is at least 1; and
  p is a number which provides a moiety weight of 400 to 10,000;
  each E' independently denotes a polymerizable unsaturated organic radical represented by the formula:

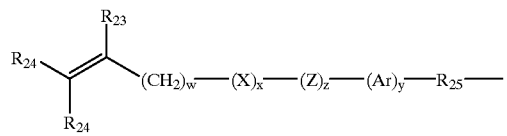

wherein:
  $R_{23}$ is hydrogen or methyl;
  $R_{24}$ is hydrogen, an alkyl radical having 1 to 6 carbon atoms, or a —CO—Y—$R_{26}$ radical wherein Y is —O—, —S— or —NH—;
  $R_{25}$ is a divalent alkylene radical having 1 to 10 carbon atoms; $R_{26}$ is a alkyl radical having 1 to 12 carbon atoms; X denotes —CO— or —OCO—; Z denotes —O— or —NH—; Ar denotes an aromatic radical having 6 to 30 carbon atoms; w is 0 to 6; x is 0 or 1; y is 0 or 1; and z is 0 or 1.

A preferred urethane monomer is represented by Formula (V):

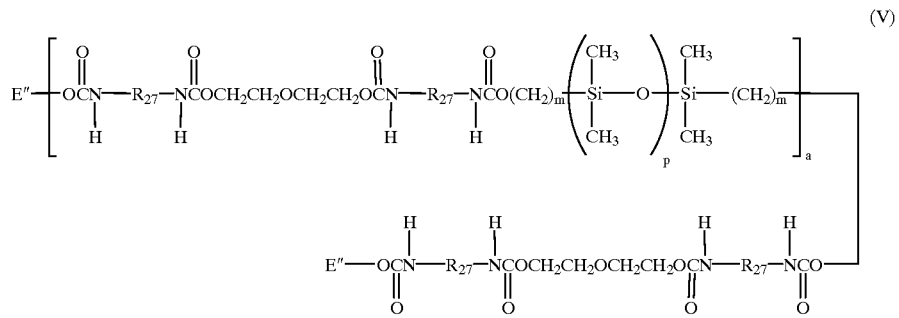

wherein m is at least 1 and is preferably 3 or 4, a is at least 1 and preferably is 1, p is a number which provides a moiety weight of 400 to 10,000 and is preferably at least 30, $R_{27}$ is a diradical of a diisocyanate after removal of the isocyanate group, such as the diradical of isophorone diisocyanate, and each E" is a group represented by:

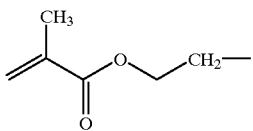

The monomer mix of the present invention may include additional constituents such as crosslinking agents, internal wetting agents, hydrophilic monomeric units, toughening agents, colorants, or UV-absorbing agents such as those known in the contact lens art.

Hydrophilic vinyl-containing monomers may be incorporated into the low water compositions of the present invention, but only in minor amounts so that the resultant copolymeric materials do not absorb appreciable amounts of water. Suitable monomers include unsaturated carboxylic acids, such as methacrylic and acrylic acids; acrylic substituted alcohols, such as 2-hydroxyethylmethacrylate and 2-hydroxyethylacrylate; vinyl lactams, such as N-vinyl pyrrolidone; and acrylamides, such as methacrylamide and N,N-dimethylacrylamide.

The monomer mixes employed in this invention can be readily cured to cast shapes by conventional methods such as UV polymerization, or thermal polymerization, or combinations thereof, as commonly used in polymerizing ethylenically unsaturated compounds. Representative free radical thermal polymerization initiators are organic peroxides, such as acetal peroxide, lauroyl peroxide, decanoyl peroxide, stearoyl peroxide, benzoyl peroxide, tertiarylbutyl peroxypivalate, peroxydicarbonate, and the like, employed in a concentration of about 0.01 to 1 percent by weight of the total monomer mixture. Representative UV initiators are those known in the field such as, benzoin methyl ether, benzoin ethyl ether, Darocure 1173, 1164, 2273, 1116, 2959, 3331 (EM Industries) and Igracure 651 and 184 (Ciba-Geigy). Photo and/or thermal curing methods are well-known to those skilled in the art.

Various processes are known for curing a monomeric mixture in the production of contact lenses, including spincasting and static casting. Spincasting methods involve charging the monomer mixture to a mold, and spinning the mold in a controlled manner while exposing the monomer mixture to UV light. Static casting methods involve charging the monomer mixture between two mold sections, one mold section shaped to form the anterior lens surface and the other mold section shaped to form the posterior lens surface, and curing the monomer mixture be exposure to UV light and/or heat. Other known methods involve forming buttons and then lathe cutting the buttons into lenses.

When used in the formation of contact lenses, it is preferred that the subject xerogels have water contents of less than about 5 weight percent and more preferably less than about 1 weight percent. Furthermore, it is preferred that such xerogels have a modulus below 300 g/mm$^2$, preferably from about 20 g/mm$^2$ to about 150 g/mm$^2$, and more preferably from about 30 g/mm2 to about 100 g/mm$^2$.

If desired, contact lenses prepared from the subject materials may be surface treated to increase wettability using techniques known in the art, for example, plasma surface treatment.

As an illustration of the present invention, several examples are provided below. These examples serve only to further illustrate aspects of the invention and should not be construed as limiting the invention.

EXAMPLES 1–9

Synthesis of Hydroxy-Terminated Copolymer

To a dried 500 mL round bottom flask equipped with a reflux condenser was added methacryloxpropyl tris (trimethylsiloxy) silane (TRIS, 100 g/0.23 mole), 2-hydroxyethyl methacrylate (HEMA, 9.36 g/0.072 mole) and anhydrous tetrahydrofuiran (THF, 100 mL). Oxygen was removed by bubbling a stream of nitrogen through for 15 minutes. The contents of the flask were then placed under a passive blanket of nitrogen. To the flask was added 2-mercaptoethanol (5.63 g/0.072 mole) and azoisobutylnitrile (AIBN, 0.34 g/0.002 mole) and the mixture was heated for 48 hours at 60° C. The conversion to polymer was estimated to be 98–99% by infrared analysis. Tetrahydrofuiran was removed by flash evaporation. The residue was then taken up in chloroform and washed 3 times with water. The organic layer was dried over anhydrous magnessium sulfate and the polymer was isolated after flash evaporation of the solvent. Analysis by size exclusion chromatography (SEC) gave Mn 1825, Mw 2561, with a polydispersity of 1.40(using polystyrene standards).

Following the procedure set forth above, additional copolymers were synthesized. These are designated 2–9 and are shown in Table 1.

TABLE 1

| Example # | TRIS (g) | HEMA (g) | SH-R-OH (g) | Mn | Mw | Pd |
|---|---|---|---|---|---|---|
| 2 | 100 | 9.36 | 5.63 | 2013 | 2574 | 1.28 |
| 3 | 100 | 9.36 | 5.36 | 2252 | 2808 | 1.25 |
| 4 | 100 | 9.36 | 5.36 | 2178 | 2801 | 1.29 |
| 5 | 100 | 9.36 | 5.36 | 1991 | 2484 | 1.24 |
| 6 | 100 | 9.36 | 5.36 | 2048 | 2572 | 1.26 |
| 7 | 200 | 18.72 | 11.26 | 2152 | 2650 | 1.25 |
| 8 | 100 | 4.68 | 2.82 | 2941 | 37.14 | 1.28 |
| 9 | 100 | 2.48 | 1.49 | 4210 | 5400 | 1.28 |

EXAMPLE 10

Macromonomer Synthesis:

To a dried 500 mL round bottom flask equipped with a reflux condenser was added the copolymer from Example 1 (87.6 g, 0.048 moles), isocyanatoethyl methacrylate (IEM, 34.3 g, 0.22 moles), dibutyltindilaurate (3.7 g, 0.006 moles), butylated hydroxy toluene (0.03 g, 0.0001 moles) and anhydrous chloroform (200 mL). The mixture was heated to reflux under a blanket of nitrogen for 5 hours then left stirring under nitrogen over night. Methanol (5 mL) was added to react with the excess IEM. The reaction mixture was then washed several times with 50 ml of purified water and dried over magnesium sulfate. The macromer was isolated after flash evaporation to remove the solvent. Analysis by proton NMR spectroscopy indicated that the prepolymer contained high levels of the methanol-IEM adduct. The crude prepolymer 40 g was dissolved in 100 mL of tetrahydrofuran. The solution was slowly added to 1500 mL of purified water with mechanical stirring. After stirring over night the solution was allowed to stand for 3 days in a refrigerator. The water layer was decanted off and the prepolymer was taken up in 100 mL of ethyl ether. The solution was dried over magnesium sulfate and filtered. The solvent was removed by flash evaporation and 30 grams of macromonomer was recovered. Analysis by SEC gave the following results: Mn=2485, Mw=3002, Pd=1.20.

EXAMPLE 11

Macromonomer Synthesis

To a dried 500 mL round bottom flask equipped with a reflux condenser was added the copolymer from Example 2 (50 g, 0.024 moles), isocyanatoethyl methacrylate (IEM, 10.14 g, 0.065 moles), dibutyltindilaurate (1.8 g, 0.003 moles), butylated hydroxy toluene (0.02 g, 0.00009 moles) and anhydrous chloroform (200 mL). The mixture was heated to reflux under a blanket of nitrogen for 4 hours. Methanol (5 mL) was added to react with the excess IEM. The reaction mixture was then washed 3 times with 50 mL of purified water and dried over magnesium sulfate. Filtration and flash evaporation to remove the solvent left 51 grams of macromonomer, an 83 percent yield.

EXAMPLES 12–18

Macromonomer Synthesis:

To a dried 500 mL round bottom flask equipped with a condenser, stirrer, thermometer and addition funnel were added the copolymer from Example 3 (50 g), triethylamine (TEA 9.8 mLs, 0.07 moles) and anhydrous chloroform (200 mL). The reaction mixture was cooled to 0° C. and a solution of methacryloyl chloride (7.3 g, 0.070 moles) in 7 mL of solvent was slowly added. The reaction was carried out under a passive blanket of nitrogen and the rate of acid chloride addition was adjusted to keep the reaction temperature below 10° C. Upon completion of the acid chloride addition the reaction was allowed to reach room temperature and was left stirring under nitrogen overnight.

The reaction mixture was washed with a 1 N hydrochloric acid/brine solution (100 mL) followed by 1 N sodium hydroxide/brine (100 mL) and then 100 mL of brine solution. The organic layer was then dried over anhydrous magnesium sulfate. The majority of the solvent was removed by flash evaporation. Traces of solvent were removed by placing the sample under a vacuum (<1 mm Hg) at 50° C. for 4 hours. The macromonomer (36 grams) was recovered. Analysis by SEC gave the following results: Mn=2342, Mw=3261 and Pd=1.39.

Following the general procedure set forth above, additional macromonomers were synthesized. These are designated 13–18 and are shown in Table 2.

TABLE 2

| Example # | Copolymer # | Copolymer (g) | Acid Chloride (g) | TEA (ml) | Solvent | ml | Mn | Mw | Pd |
|---|---|---|---|---|---|---|---|---|---|
| 13 | 4 | 50 | 7.7 | 10.4 | Ethyl Ether | 200 | 2330 | 3498 | 1.5 |
| 14 | 5 | 40 | 5.7 | 7.7 | Ethyl Acetate | 250 | 2101 | 2645 | 1.26 |
| 15 | 6 | 31.5 | 4.5 | 6.1 | Ethyl Acetate | 200 | 2210 | 2785 | 1.26 |
| 16 | 7 | 100 | 14.4 | 19 | Ethyl Acetate | 500 | 2183 | 4093 | 1.25 |
| 17 | 8 | 20 | 1.54 | 2.1 | Ethyl Acetate | 400 | 2992 | 3798 | 1.27 |
| 18 | 9 | 25 | 1.3 | 2.4 | Ethyl Acetate | 400 | 4753 | 6186 | 1.30 |

FILM EXAMPLES

Film Synthesis

Each of the constituents identified in the following Tables 3–7 were combined in the ratios indicated along with a UV initiator and mixed for approximately 20 minutes. Each of the compositions was then cast as a film for mechanical property evaluations using the following procedure. Films of each composition were cast between silanized glass plates with a 0.3 mm Teflon spacer. Curing was accomplished by exposure to ultraviolet light (3000–3500 $\mu W/cm^2$). The UV initiator was Darocure 1173 (0.5% concentration). The resultant films were extracted 16 hours in 2-propanol and then dried under vacuum. The mechanical properties of films were determined on an Instron Model 4500 using ASTM methods 1708 and 1938. Definitions of abbreviations used in the table are as follows: pbw=parts by weight; $M_2D_x$=the structural formula IIIa wherein D represents the —(CH$_3$)$_2$SiO-group, x is an integer corresponding to d, each M represents the end group

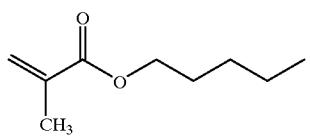

attached at the two ends of the D chain.

TABLE 3

| Example | Macromonomer A (pbw) | TRIS (pbw) | M2D100 (pbw) | Modulus (g/mm2) | Tensile (g/mm2) | Tear Strength (g/mm) | Elongation (%) |
|---|---|---|---|---|---|---|---|
| C1 | — | 80 | 20 | 10 | 21 | NM* | 249 |
| C2 | — | 90 | 10 | NM* | NM* | NM* | NM* |
| C3 | — | 85 | 15 | NM* | NM* | NM* | NM* |

* NM is used to indicate that the properties were not measurable.
As summarized in Table 3, the copolymer films were generally unacceptable for soft contact lens applications.

TABLE 4

| Example | Macromonomer A (pbw) | TRIS (pbw) | M2D100 (pbw) | Modulus (g/mm2) | Tensile (g/mm2) | Tear Strength (g/mm) | Elongation (%) |
|---|---|---|---|---|---|---|---|
| 19 | 25 | 50 | 1 | NM | NM | NM | NM |
| 20 | 50 | 50 | 5 | 459.3 | 47.74 | 105.2 | 61.2 |
| 21 | 25 | 75 | 1 | 141.5 | 24.1 | NM | 121.1 |
| 22 | 50 | 75 | 5 | 273.9 | 41.79 | 114.8 | 92.6 |
| 23 | 50 | 50 | 1 | NM | NM | NM | NM |
| 24 | 25 | 50 | 5 | 110.6 | 33.1 | 94.8 | 115.7 |
| 25 | 25 | 75 | 5 | 96.5 | 25.93 | 108.3 | 149.2 |
| 26 | 50 | 75 | 1 | NM | NM | NM | NM |
| 27 | 25 | 75 | 5 | 110 | 20 | 105 | 128 |

Films with more desirable physical properties were obtained when M2D100 was largely replaced with the macromonomer of Example 10 of this invention. However, it is noted that the modulus of some of these films was too high for soft contact lens applications.

TABLE 5

Increasing the amount of M2D100 relative to the amount of macromonomer (from Example 11 for both Tables 5 and 6) tended to lower the modulus and increase elongation. Copolymers having more acceptable mechanical properties for soft contact lens applications were obtained by replacing M2D100 with shorter-chained monomers; M2D25 or M2D50 (see Table 6).

| Example | Macromonomer A (pbw) | TRIS (pbw) | M2D100 (pbw) | Tensile (g/mm2) | Elongation (%) |
|---|---|---|---|---|---|
| 5a | 15 | 75 | 10 | 35 | 313 |
| 5b | 15 | 90 | 10 | 38 | 339 |
| 5c | 15 | 75 | 15 | 39 | 285 |
| 5d | 10 | 90 | 10 | 39 | 393 |
| 5e | 10 | 90 | 15 | 28 | 273 |
| 5f | 15 | 90 | 15 | 36 | 287 |
| 5g | 10 | 75 | 15 | 36 | 312 |
| 5h | 10 | 75 | 10 | 37 | 370 |

TABLE 6

| Example | Macromonomer A (pbw) | TRIS (pbw) | M2D50 (pbw) | M2D25 (pbw) | Modulus (g/mm2) | Tensile (g/mm2) | Tear Strength (g/mm) | Elongation (%) |
|---|---|---|---|---|---|---|---|---|
| 6a | 10 | 90 | 0 | 15 | 75 | 64 | 17 | 102 |
| 6b | 5 | 75 | 0 | 15 | 63 | 47 | 11 | 88 |
| 6c | 5 | 75 | 15 | 0 | 26 | 27 | 12 | 128 |
| 6d | 5 | 90 | 0 | 15 | 64 | 53 | 15 | 114 |
| 6e | 10 | 90 | 15 | 0 | 30 | 42 | 17 | 164 |

TABLE 6-continued

| Example | Macromonomer A (pbw) | TRIS (pbw) | M2D50 (pbw) | M2D25 (pbw) | Modulus (g/mm2) | Tensile (g/mm2) | Tear Strength (g/mm) | Elongation (%) |
|---|---|---|---|---|---|---|---|---|
| 6f | 10 | 75 | 15 | 0 | 77 | 60 | 17 | 96 |
| 6g | 5 | 90 | 15 | 0 | 28 | 41 | 15 | 165 |
| 6h | 10 | 75 | 0 | 15 | 31 | 36 | 14 | 132 |

TABLE 7

Addition of a fluoroalkyl methacrylate monomer (OFPMA) provided films with reduced tackiness but unacceptably high modulus. These films were thermal cured with an organic peroxide as a thermal polymerization initiator (LUPERSOL 256, from ELF ATOCHEM). The macromonomer is from Example 13.

| Example | Macromonomer A (pbw) | TRIS (pbw) | OFPMA (pbw) | M2D100 (pbw) | Modulus (g/mm2) | Tensile (g/mm2) | Tear Strength (g/mm) | Elongation (%) |
|---|---|---|---|---|---|---|---|---|
| 7a | 10 | 90 | 0 | 10 | 44 | 39 | NM | 393 |
| 7b | 10 | 67.5 | 22.5 | 10 | 461 | 119 | 141 | 257 |
| 7c | 10 | 45 | 45 | 10 | 3379 | 430 | 297 | 256 |
| 7d | 10 | 22.5 | 67.5 | 10 | 7063 | 711 | 339 | 11 |

LENS EXAMPLES
Synthesis of Contact Lenses

A lot of 24 lenses was prepared the following way:

A monomer mix was prepared with the following components: Darocur 1173 (0.0995 g), Macromonomer A from Example 13 (1.9903 g), $M_2D_{100}$ (3.98 g) and TRIS (13.9302 g). The monomer mix was allowed to stir for 20 minutes and then passed through a 0.45 micron filter. A metered amount of monomer solution was then introduced to between a posterior and anterior mold. The filled mold was then clamped together. Curing was accomplished by exposure to UV irradiation. All fills and curing were carried out under an inert nitrogen atmosphere. Lenses were removed from the molds and placed in 2-propanol to extract any unreacted monomers. Solvent was then removed under reduced pressure and the material surface was made wettable by oxidative plasma treatment. Lenses were placed in a buffered saline solution.

Additionally, a second lot of 24 lenses was cast from the monomer mix following the same procedure. The mechanical properties of these two lots of lenses are given in the table below. Each value represents an average of 24 measurements.

TABLE 8

Mechanical Properties of Lenses

| Lot # | Modulus (g/mm²) | Tensile (g/mm²) | Elongation (percent) |
|---|---|---|---|
| 1 | 57 | 39 | 112 |
| 2 | 50 | 33 | 108 |

Many other modifications and variations of the present invention are possible to the skilled practitioner in the field in light of the teachings herein. It is therefore understood that, within the scope of the claims, the present invention can be practiced other than as herein specifically described.

We claim:

1. A low water polymeric silicone composition which is the polymerization product of a mixture comprising:

(A) a macromonomer of the general Formula (I):

$$(X)(E)_n \qquad (I)$$

wherein:

X is derived from a copolymer prepared by reacting the following components:
(a) at least 50 mole % of an ethylenically unsaturated silicon-containing monomer,
(b) 2.5 to 20 mole % of an ethylenically unsaturated monomer containing a hydroxyl, amino or carboxylic acid radical,
(c) 0 to 15 mole % of an ethylenically unsaturated monomer other than monomers (a) or (b),
(d) 2.5 to 20 mole % of a chain transfer agent, and the mole percent of components (a), (b), (c) and (d) being based on the total amount of said components;

E is a polymerizable, ethylenically unsaturated radical;

n is at least 2; and (B) an ethylenically unsaturated silicone-containing monomer other than the macromonomer of Formula (I).

2. The composition of claim 1, which is the polymerization product of a mixture that includes the macromonomer of Formula (I) and (B), wherein the ethylenically unsaturated silicone-containing monomer is selected from the group consisting of monofunctional ethylenically unsaturated silicone-containing monomers and difunctional ethylenically unsaturated silicone-containing monomers.

3. The composition of claim 2, which is the polymerization product of a mixture that includes the macromonomer of Formula (I), a monofunctional ethylenically unsaturated silicone-containing monomer and a difunctional ethylenically unsaturated silicone-containing monomer.

4. The composition of claim 2, wherein the macromonomer of formula I includes a compound of Formula (II):

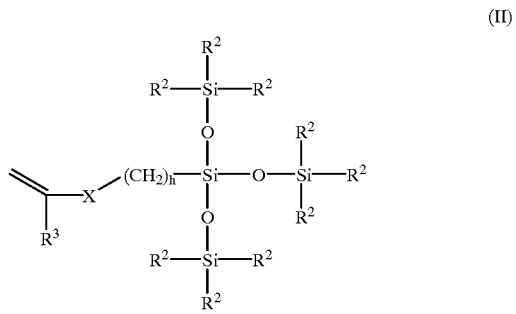

wherein:

X denotes —COO—, —CONR$^4$—, —OCOO—, or —OCONR$^4$— where each where R$^4$ is H or lower alkyl; R$^3$ denotes hydrogen or methyl; h is 1 to 10; and each R$^2$ independently denotes a lower alkyl radical, a phenyl radical or a radical of the formula —Si(R$^5$)$_3$ wherein each R$^5$ is independently a lower alkyl radical or a phenyl radical.

5. The composition of claim 4, wherein the ethylenically unsaturated silicone-containing monomer further includes a compound of the formula:

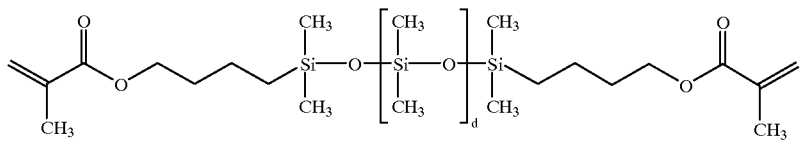

6. The composition of claim 1, wherein component (a) of the macromonomer is derived from methacryloxypropyl tris (trimethylsiloxy) silane.

7. The composition of claim 1, wherein component (b) of the macromonomer is derived from a monomer selected from the group consisting of hydroxyl-substituted (meth) acrylates, hydroxyl-substituted (meth)acrylamides, amino-substituted (meth)acrylates, and amino-substituted (meth) acrylamides.

8. The composition of claim 7, wherein the component (b) of the macromonomer is derived from at least one hydroxyl-substituted (meth)acrylate selected from the group consisting of 2-hydroxyethyl methacrylate, 2-hydroxyethyl acrylate, glycerol methacrylate, glycerol acrylate, polyethylene glycol methacrylate, and polyethylene glycol acrylate.

9. The composition of claim 8, wherein component (c) of the macromonomer is derived from 2-mercaptoethanol, thioglycolic acid or 2-aminoethanethiol.

10. The composition of claim 1, wherein X the macromonomer is based on a copolymer of methacryloxypropyl tris (trimethylsiloxy) silane, 2-hydroxyethyl methacrylate and mercaptoethanol.

11. The composition of claim 10, wherein B of the macromonomer is derived from 2-isocyanatoethyl methacrylate.

12. A medical device formed from a low water composition which is the polymerization product of a mixture comprising:

(A) a macromonomer of the general Formula (I):

$$(X)(E)_n \quad (I)$$

wherein:
X is derived from a copolymer prepared by reacting the following components:
(a) at least 50 mole % of an ethylenically unsaturated silicon-containing monomer,
(b) 2.5 to 20 mole % of an ethylenically unsaturated monomer containing a hydroxyl, amino or carboxylic acid radical,
(c) 0 to 15 mole % of an ethylenically unsaturated monomer other than monomers (a) or (b),
(d) 2.5 to 20 mole % of a chain transfer agent, and
the mole percent of components (a), (b), (c) and (d) being based on the total amount of said components;

E is a polymerizable, ethylenically unsaturated radical;
n is at least 2; and (B) an ethylenically unsaturated silicone-containing monomer other than the macromonomer of Formula (I).

13. The medical device of claim 1, which is the polymerization product of a mixture that includes the macromonomer of Formula (I) and (B), wherein the ethylenically unsaturated silicone-containing monomer is selected from the group consisting of monofunctional ethylenically unsaturated silicone-containing monomers and difunctional ethylenically unsaturated silicone-containing monomers.

14. The medical device of claim 2, which is the polymerization product of a mixture that includes the macromonomer of Formula (I), a monofunctional ethylenically unsaturated silicone-containing monomer and a difunctional ethylenically unsaturated silicone-containing monomer.

15. The medical device of claim 2, wherein the macromonomer of formula I includes a compound of Formula (II):

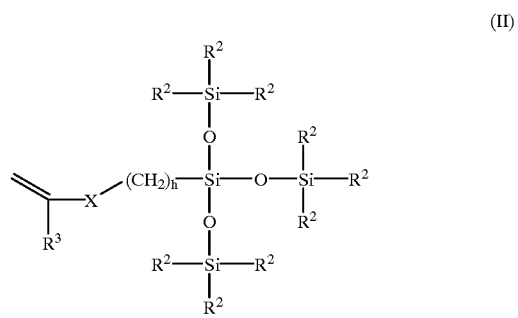

wherein:
X denotes —COO—, —CONR$^4$—, —OCOO—, or —OCONR$^4$— where each where R$^4$ is H or lower alkyl; R$^3$ denotes hydrogen or methyl; h is 1 to 10; and each R$^2$ independently denotes a lower alkyl radical, a phenyl radical or a radical of the formula —Si(R$^5$)$_3$ wherein each R$^5$ is independently a lower alkyl radical or a phenyl radical.

16. The medical device of claim 4, wherein the ethylenically unsaturated silicone-containing monomer further includes a compound of the formula:

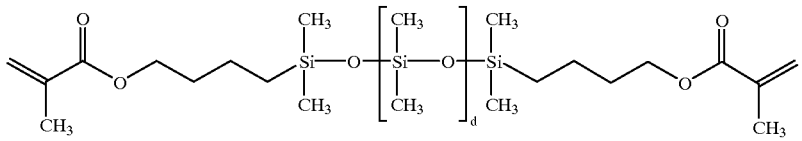

17. The medical device of claim 1, wherein component (a) of the macromonomer is derived from methacryloxypropyl tris (trimethylsiloxy) silane.

18. The medical device of claim 1, wherein component (b) of the macromonomer is derived from a monomer selected from the group consisting of hydroxyl-substituted (meth) acrylates, hydroxyl-substituted (meth)acrylamides, amino-substituted (meth)acrylates, and amino-substituted (meth) acrylamides.

19. The medical device of claim 7, wherein the component (b) of the macromonomer is derived from at least one hydroxyl-substituted (meth)acrylate selected from the group consisting of 2-hydroxyethyl methacrylate, 2-hydroxyethyl acrylate, glycerol methacrylate, glycerol acrylate, polyethylene glycol methacrylate, and polyethylene glycol acrylate.

20. The medical device of claim 8, wherein component (c) of the macromonomer is derived from selected from 2-mercaptoethanol, thioglycolic acid or 2-aminoethanethiol.

21. The medical device of claim 1, wherein the macromonomer is based on a copolymer of methacryloxypropyl tris (trimethylsiloxy) silane, 2-hydroxyethyl methacrylate and mercaptoethanol.

22. The medical device of claim 1, wherein B of the macromonomer is derived from 2-isocyanatoethyl methacrylate.

23. The medical device of claim 1, wherein the medical device is a soft contact lens.

24. The medical device of claim 1, wherein the medical device is a rigid gas permeable contact lens.

25. The medical device of claim 1, wherein the medical device is an intraocular lens.

26. A macromonomer useful in the preparation of a low water polymeric silicone composition consisting of the following Formula (Ia):

wherein:

X is derived from a copolymer prepared by reacting the following components:
(a) at least 80 mole % of an ethylenically unsaturated silicon-containing monomer,
(b) 2.5 to 20 mole % of an ethylenically unsaturated monomer containing an active hydrogen atom,
(c) 0 to 15 mole % of an ethylenically unsaturated monomer other than monomers (a) or (b), and
(d) 2.5 to 20 mole % of a chain transfer agent,
the weight percent of components (a), (b), (c) and (d) being based on the total amount of said components;

E is a polymerizable, ethylenically unsaturated radical; and n is at least 2;

wherein the low water polymeric silicone composition when cured absorbs maximumly 5% or less of water base on the total weight of the polymeric silicone and water.

* * * * *

UNITED STATES PATENT AND TRADEMARK OFFICE
CERTIFICATE OF CORRECTION

PATENT NO. : 5,981,675
DATED : November 9, 1999
INVENTOR(S) : Paul L. Valint, Jr., Joseph A. McGee, and Richard M. Ozark It is certified that error appears in the above-identified patent and that said Letters Patent is hereby corrected as shown below:

In column 14, after line 27 start a new indented line and insert -- wherein the low water polymeric silicone composition when cured absorbs maximumly 5% or less of water base on the total weight of the polymeric silicone and water. --;

In column 14, line 40, insert --component (a) of-- before "the macromonomer".

In column 14, line 41, delete "of formula I";

In column 16, after line 15 start a new indented line and insert -- wherein the low water polymeric silicone composition when cured absorbs maximumly 5% or less of water base on the total weight of the polymeric silicone and water. --;

In column 16, line 28, insert --component (a) of-- before "the macromonomer";

In column 16, line 29, delete "of formula I"

Signed and Sealed this

Ninth Day of May, 2000

*Attest:*

Q. TODD DICKINSON

*Attesting Officer*  *Director of Patents and Trademarks*